N. A. LOCKWOOD.
FILTER PRESS COCK.
APPLICATION FILED FEB. 19, 1910.

974,580.

Patented Nov. 1, 1910.

Witnesses
C. K. Davies
M. E. Moore

N. A. Lockwood,
Inventor
By Wm. N. Moore
Attorney

UNITED STATES PATENT OFFICE.

NELSON A. LOCKWOOD, OF LOGAN, UTAH, ASSIGNOR OF ONE-HALF TO LE ROY ECCLES, OF LOGAN, UTAH.

FILTER-PRESS COCK.

974,580.  Specification of Letters Patent.  Patented Nov. 1, 1910.

Application filed February 19, 1910. Serial No. 544,932.

*To all whom it may concern:*

Be it known that I, NELSON A. LOCKWOOD, a citizen of the United States, residing at Logan, in the county of Cache and State of Utah, have invented certain new and useful Improvements in Filter-Press Cocks, of which the following is a specification.

My invention relates to improvements in filter press cocks, and the leading object of my invention is the provision of a filter press cock for controlling the discharge of the beet, cane or like juice from the filter press which will dispense with the use of any packing or washers and which will be formed entirely of metal which will resist the corrosive action of said juices and will therefore at all times prove an efficient cock which will prevent the juices from seeping or leaking therethrough.

A further object of the invention is the provision of a filter press cock which will be formed of a material which will resist the action of the juices and which can be placed when desired in an acid bath to remove the scale or deposits therefrom and which will not be injured in any way or have its efficiency impaired by the action of the acid thereon.

Another object of the invention is the provision of a cock formed of a series of parts which may be easily taken apart to clean the same, thus permitting of access to all interior parts of the cock to prevent the same from becoming fouled, said parts being made of a standard size and interchangeable so that they may be cheaply and easily replaced when worn or damaged in any way.

To attain the desired objects, my invention consists in a filter press cock embodying novel features of construction and combination and arrangement of parts for service substantially as described and as illustrated in the accompanying drawings.

Figure 1:
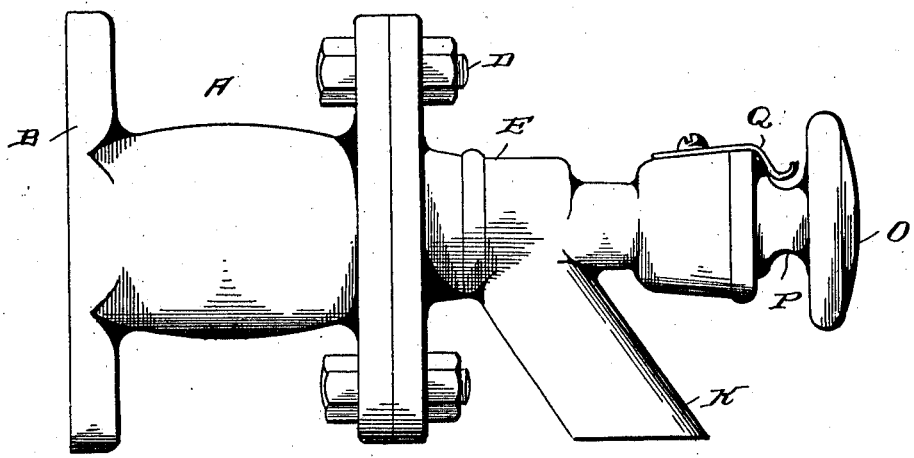
Figure 2:
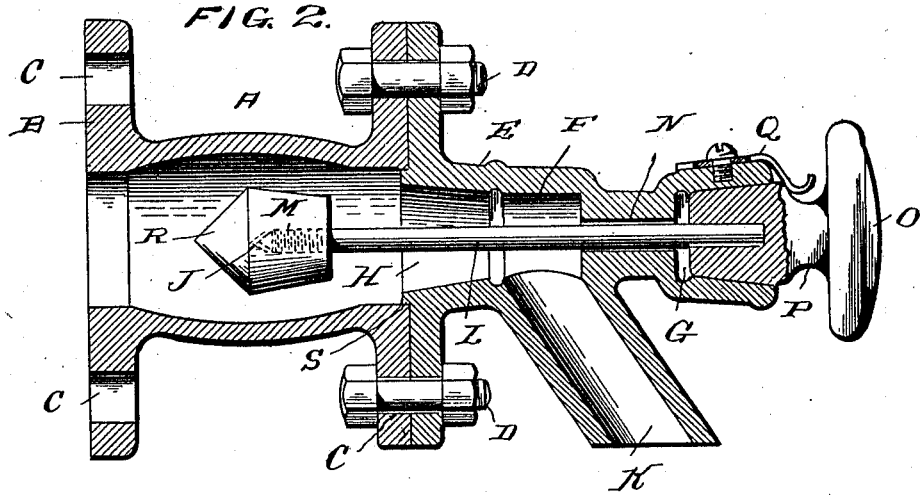

Figure 1 represents a side elevation of my improved cock, and, Fig. 2 represents a longitudinal sectional view thereof.

In the drawings, in which similar characters of reference are employed to denote corresponding parts in the several views, the letter A designates the base section of the device, said section being provided at each end with an annular flange B provided with bolt receiving apertures C, said member A being of similar configuration at both ends as will be best understood by reference to Fig. 2 and thus being reversible, which increases its life, inasmuch as in case the end secured to the filter press should become slightly worn in any way so that it no longer made a perfectly tight joint with the press the device can be reversed presenting a new surface which will make a tight joint.

Secured to the flange B at one end of the portion A by means of the bolts D is the valve casing E of the device, said casing having a central passage F extending longitudinally thereof and terminating at its outer end in a cup-like recess G, while said passage at the other end has a regularly outward flaring portion H providing a seat for the valve or plug J which is tapered to correspond with and be tightly engaged in said seat. Formed on one side of the casing E and communicating with the passage F intermediate the recess G and the seat H is a spout K for discharging the juices into a trough or suitable receptacle.

To move the valve J into and out of its seat to regulate the flow of the juice through the cock, I employ the operating rod L having a screw threaded end engaged in a threaded socket M in the rear of the valve, said rod extending through the passage F which is provided with the reduced portion N of size to receive and engage the rod to prevent the juice from flowing through the passage when the valve is out of its seat as shown in Fig. 2. Engaged on the outer end of the rod L is the handle or knob O for operating the same, said knob having a portion adapted to fit into the recess G and being provided adjacent said portion with the annular groove P, there being a spring Q secured to the casing and adapted to engage said groove to hold the knob and thus the valve inward out of engagement with its seat against the pressure of the juice thereagainst.

From the foregoing description taken in connection with the drawings the construction and operation of my improved filter press cock will be readily understood and its advantages be fully appreciated, and it will be seen that I provide an extremely simple, cheap and durable cock for use on filter presses which is of the highest efficiency and which can be readily applied in position for use or removed for cleaning by merely bolting or unbolting the same. It will be further observed that the valve J is provided with a pointed inner end R which serves to break the flow of juice and direct it toward the sides of the casing, thus decreasing the pressure on the valve tending to force the same back into its seat, while the casing A rounds or bulges out at its intermediate portion in which the valve lies when out of its seat, thus providing a larger containing portion for the fluid, allowing the same to spread out and decreasing the pressure thereof.

As has been previously pointed out, the casing A may be reversed if desired to provide a new surface for securing to the filter press, and to insure at all times and under all conditions a tight joint between the portions A and E, I provide on the latter the peripheral flange S extending around the valve seat and adapted to fit tightly in the end of the section A, said flange also serving to reduce the internal diameter of the bore of the cock from that of the casing A to that of the valve seat.

It will be seen that my cock, being of metal throughout will be very durable and strong, there being no parts to get out of order, that it will not require the constant attention necessary when fibrous or other washers or packing is employed which readily rots or is eaten by the solutions passing through the cock, that it is simple of operation, to open the same it being merely necessary to press inward on the knob until the spring engages the groove therein to retain the device open against the pressure of the fluid, while an outward pull serves to instantly stop the flow of said liquid and seat the valve, the length of the valve seat and the shape of said seat and valve insuring the tight engagement of the valve and seat at all times and compensating for the wear thereon. It is also evident that my cock is extremely advantageous in that it may very readily be disassembled to clean the same, to clean it it merely being necessary to remove the bolts securing the parts A and E together when a brush may be inserted in the part A to clean the interior thereof, while the parts forming the valve proper carried by the casing E are all exposed to view and can be quickly cleaned, while if it is desired to brush out the spout and the passage F all that is necessary is to unscrew the plug from the operating rod when said rod may be removed and the entire device subjected to a thorough cleaning. From the above it will be further seen that it is but a moment's work to replace any worn or damaged part with a new one and that the valve can be cleaned or repaired by any one capable of using a monkey wrench without the necessity for any particular skill or mechanical knowledge.

I claim:

1. In a cock of the character described, the combination with a casing adapted to have one end secured to a source of supply, of a supplemental casing secured to and making a tight joint with the other end thereof, coincident passages extending through the two casings, the passage in the supplemental casing having a flaring portion at each end with a portion of decreased diameter intermediate said portions, and a rod reciprocably mounted in said reduced portion and bearing on one end a valve adapted to be seated in one of the flaring portions to close the passage and on the other end a head adapted to be engaged in the other flaring portion when the valve is unseated.

2. In a cock, the combination with a casing provided with an attaching flange at each end, of a supplemental casing secured to one of said flanges and making a tight joint therewith, a T-shaped passage formed in the supplemental casing and having one end of the head of the T in communication with the passage in the main casing, the stem of the T being adapted to form a spout, a valve seat formed at one end of the head of the T and a recess at the other end, and a rod reciprocally mounted in said head passage and provided on one end with a valve adapted to close the end of the passage adjacent the reversible casing by being engaged in the valve seat and bearing on the other end means adapted to be engaged in said recess when the valve is out of its seat, and means for locking said means in position.

In testimony whereof I affix my signature, in presence of two witnesses.

NELSON A. LOCKWOOD.

Witnesses:
   JAS. PUIMEY, Jr.,
   W. W. LOW.